(12) United States Patent
Callsen et al.

(10) Patent No.: US 6,510,460 B1
(45) Date of Patent: Jan. 21, 2003

(54) METHOD AND APPARATUS FOR ENFORCING LOCKING INVARIANTS IN MULTI-THREADED SYSTEMS

(75) Inventors: Christian J. Callsen, Redwood City, CA (US); Ken M. Cavanaugh, Montara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 08/993,206

(22) Filed: Dec. 18, 1997

(51) Int. Cl.[7] .............................................. G06F 15/173
(52) U.S. Cl. ........................................ 709/223; 709/229
(58) Field of Search ...................... 707/103, 8; 395/700, 395/161, 551; 709/104–106, 108, 315, 316, 103, 219, 229, 224, 107, 102, 100, 223; 717/4; 710/200

(56) References Cited

U.S. PATENT DOCUMENTS

| | | | |
|---|---|---|---|
| 4,823,310 A | | 4/1989 | Grand |
| 5,012,409 A | * | 4/1991 | Fletcher et al. ............. 709/103 |
| 5,218,699 A | | 6/1993 | Brandle et al. |
| 5,263,160 A | | 11/1993 | Porter et al. |
| 5,307,490 A | | 4/1994 | Davidson et al. |
| 5,341,478 A | | 8/1994 | Travis, Jr. et al. |
| 5,455,951 A | * | 10/1995 | Bolton et al. ............... 395/700 |
| 5,465,363 A | * | 11/1995 | Orton et al. ................ 709/107 |
| 5,475,845 A | * | 12/1995 | Orton et al. ................ 395/700 |
| 5,481,706 A | * | 1/1996 | Peek .......................... 710/200 |
| 5,491,800 A | | 2/1996 | Goldsmith et al. |
| 5,493,680 A | | 2/1996 | Danforth |
| 5,515,508 A | | 5/1996 | Pettus et al. |
| 5,540,014 A | | 7/1996 | Smith |
| 5,566,302 A | | 10/1996 | Khalidi et al. |
| 5,577,251 A | | 11/1996 | Hamilton et al. |
| 5,581,680 A | | 12/1996 | Sfarti et al. |
| 5,682,534 A | | 10/1997 | Kapoor et al. |
| 5,692,157 A | | 11/1997 | Williams |
| 5,724,503 A | | 3/1998 | Kleinman et al. |
| 5,727,145 A | | 3/1998 | Nessett et al. |
| 5,734,903 A | | 3/1998 | Saulpaugh et al. |
| 5,737,607 A | * | 4/1998 | Hamilton et al. ............... 717/1 |
| 5,740,355 A | | 4/1998 | Watanabe et al. |
| 5,748,963 A | | 5/1998 | Orr |
| 5,751,962 A | | 5/1998 | Fanshier et al. |

(List continued on next page.)

OTHER PUBLICATIONS

Public Bhandler, The application Kit: BLopper, http://andromeda.68k.org/mirror/BeBook_DR7/AppKit/Looper.html.*

Gosling et al, Java Language Specification, 1996, http://asuwlink.uwyo.edu/sun-iws/index.html.*

Guide to DECthreads, http://ccpc5.unican.es.doc/du-40D-doc/AQ2DPDTK/DOCU_029.htm, Nov. 1997.*

Shaprio, A Binding protocol for distributed shared objects. IEEE, 1994.*

(List continued on next page.)

Primary Examiner—Mark H. Rinehart
Assistant Examiner—Thong Vu
(74) Attorney, Agent, or Firm—Kudirka & Jobse LLP (57) ABSTRACT

In order to maintain locking invariants in a multi-threaded system, a special inverse lock class is defined whose constructor stores a reference to, and then releases, a previously-acquired lock whose reference is passed into it. The destructor of the class re-acquires the referenced lock. During operation, the class is instantiated, passing in the desired lock before an upcall is made. Instantiation executes the constructor and causes the lock to be released. When the upcall terminates, either normally or by an exception, the inverse lock object destructor is executed causing the lock to be re-acquired. Since the inverse lock object destructor will always be called when the object is destroyed, the locking invariant will always be satisfied.

39 Claims, 6 Drawing Sheets

U.S. PATENT DOCUMENTS

| | | | |
|---|---|---|---|
| 5,758,342 A | | 5/1998 | Gregerson |
| 5,761,670 A | * | 6/1998 | Joy .......................... 707/103 |
| 5,787,251 A | | 7/1998 | Hamilton et al. |
| 5,787,447 A | | 7/1998 | Smithline et al. |
| 5,790,848 A | | 8/1998 | Wlaschin |
| 5,793,965 A | * | 8/1998 | Vanderbilt et al. .......... 709/203 |
| 5,809,507 A | | 9/1998 | Cavanaugh, III |
| 5,812,768 A | | 9/1998 | Pagé et al. |
| 5,815,703 A | | 9/1998 | Copeland et al. |
| 5,819,093 A | | 10/1998 | Davidson et al. |
| 5,832,487 A | | 11/1998 | Olds et al. |
| 5,835,906 A | | 11/1998 | Hagersten et al. |
| 5,848,236 A | | 12/1998 | Dearth et al. |
| 5,852,731 A | * | 12/1998 | Wang et al. ................. 709/100 |
| 5,862,376 A | * | 1/1999 | Steele, Jr. et al. .......... 709/107 |
| 5,864,866 A | | 1/1999 | Henckel et al. |
| 5,870,753 A | | 2/1999 | Chang et al. |
| 5,870,805 A | | 2/1999 | Bracho et al. |
| 5,873,116 A | | 2/1999 | Van Fleet |
| 5,881,315 A | | 3/1999 | Cohen |
| 5,892,946 A | | 4/1999 | Woster et al. |
| 5,893,118 A | * | 4/1999 | Sonderegger ............... 707/203 |
| 5,907,675 A | * | 5/1999 | Aahlad ....................... 709/203 |
| 5,913,038 A | | 6/1999 | Griffiths |
| 5,915,252 A | | 6/1999 | Misheski et al. |
| 5,926,775 A | * | 7/1999 | Brumley et al. ............. 702/127 |
| 5,928,323 A | * | 7/1999 | Gosling et al. ............. 709/203 |
| 5,933,605 A | | 8/1999 | Kawano et al. |
| 5,946,680 A | | 8/1999 | Shorter et al. |
| 5,953,530 A | * | 9/1999 | Rishi et al. .................... 717/4 |
| 5,958,006 A | | 9/1999 | Eggleston et al. |
| 5,974,410 A | | 10/1999 | Copeland et al. |
| 5,978,940 A | | 11/1999 | Newman et al. |
| 5,991,823 A | | 11/1999 | Cavanaugh, III et al. |
| 6,016,499 A | | 1/2000 | Ferguson |
| 6,026,401 A | * | 2/2000 | Brealey et al. ................. 707/8 |
| 6,044,404 A | * | 3/2000 | Holdsworth et al. ........ 709/229 |
| 6,044,409 A | * | 3/2000 | Lim et al. ................... 709/315 |
| 6,052,731 A | * | 4/2000 | Holdsworth et al. ........ 709/229 |
| 6,101,569 A | * | 8/2000 | Miyamoto et al. .......... 710/200 |
| 6,128,640 A | * | 10/2000 | Kleinman ................... 709/102 |
| 6,185,609 B1 | * | 2/2001 | Rangarajan et al. ........ 709/219 |

OTHER PUBLICATIONS

Bhoedjang, Friendly and efficient message handling, IEEE, 1996.*

IBM Technical Disclosure Bulletin, "Remote Procedure Call Stub Size Reduction Technique—Combining Parameter Code", vol. 36, No. 09B, Sep., 1993, pp. 351–352.

IBM Technical Disclosure Bulletin, "Callos2w XP 000587433" vol. 39, No. 04, Apr. 1996, pp. 91–96.

IBM's SOMobjects Developer Toolkit, Users Guide,"An Introductory Guide to the System Object Model and Its Accompanying Frameworks", Version 2.0, Jun. 1993.

Object Management Group, "The Common Object Request Broker: Architecture and Specification" Revision 2.0, Jul., 1995.

Hamilton, Graham, et al., "Subcontract: A Flexible Base for Distributed Programming", Apr., 1993.

Pyarali, Irfan et al., An Overview of the CORBA Portable Object Adapter, ACM Standard View, 1998, pp. 1–13, St. Louis, MO.

Kleindienst, Jan et al., Lessons Learned from Implementing the CORBA Persistent Object Service, ACM Standard View, 1996, pp. 150–167, Czech Republic.

Schmidt, Douglas C. et al., Object Interconnections, SIGS C++ Report, 1997, pp. 1–9, St. Louis, MO.

Reverbel, Francisco C.R. et al., Making CORBA Objects Persistent: the Object Database Adapter Approach, Proceedings of the Third USENIX Conference, 1997, Portland, Oregon.

Silva, Antionio Rito et al., Distributed Proxy: a Design Pattern for Distributed Object Communication, Conference of Pattern Languages of Programs, 1997, pp. 1–8, Allerton Park, Illinois.

Sun, Portable Object Adapter, 2002.

(Bull) Groupe Bull et al. "Joint Project Services Submission—Life Cycle and Association Services Specification".

Roger S. Chin et al., "Distributed Object–Based Programming Systems".

Silicon Graphics, "Iterators" http://www.rt.e–technik.tu-–darmstadt.de/~mali/DOC/STL_doc/iterators.html, pp. 1–3.

OMG Security Specification Document Formal/97–11–05, pp. 15–9 to 15–10; pp. 15–147 to 15–162 (Section 15–7); pp. 15–219 to 15–230 (appendix B–6 to B–9.3) OMG Website—www.omg.org.

The Orbix 2 Reference Guide, Release 2.0 Nov. 1995, pp. 197–209; The Orbix 2 Programming Guide, Release 2.0 Nov. 1995, pp. 143, pp. 189–196, pp. 303–304— Support@iona.com.

Evaluations, Orbix (IONA), pp. 1–2—http://www.c3.lanl.gov/village/dist–comp/section2_5_2.html.

Orbix, Market–Leading Implementation of CORBA 2, pp. 1–3—http://www.blackwhite.com/products/orbix.html.

IONA Technologies, IONA Delivers Full Suite of Features for Orbix 2.1, pp. 1–2—http://www.iona.com/news/press-room/Orbix21Features.html.

Iona Technologies, Apr. 1994, Version 1.2.1 Release Notes, pp. 1–4—http://www.up.ac.za/hsn/docs/orbix/RelNotes-12.txt.

IONA Technologies, Orbix C+++ Version(s): All, pp. 1—http://www–usa.iona.com/support/kb/Orbix$_{13}$ C++/articles/324.805.html.

IONA Technologies, Orbix C++ Version(s): 2.x, pp. 1—http://www–usa.iona.com/support/kb/Orbix_C++/articles/238.214.html.

IONA Technologies, Orbix C++ Version(s): 2.X, pp. 1–2— htpp://www–usa.iona.com/support/kb/Orbix_C++/articles/239.540.html.

IONA Technologies, Orbix C++ Version(s): All, pp. 1–2— http://www–usa.iona.com/support/kb/Orbix_C++/articles/351.196.html.

IONA Technologies, Orbix C++ Version(s) All, pp. 1–2— http://www–usa.iona.com/support/kb/Orbix_C++/articles/352.291.html.

* cited by examiner

METHOD AND APPARATUS FOR ENFORCING LOCKING INVARIANTS IN MULTI-THREADED SYSTEMS

CROSS REFERENCE TO RELATED APPLICATIONS

The following U.S. patent applications are related to the present application and are incorporated by reference herein in their entirety:

U.S. patent application Ser. No. 08/554,794, filed Nov. 7, 1995 as a continuation to U.S. patent application Ser. No. 07/995,863, filed Dec. 21, 1992 (now abandoned);

U.S. patent application Ser. No. 08/670,682, filed Jun. 26, 1996;

U.S. patent application Ser. No. 08/673,181, filed Jun. 26, 1996;

U.S. patent application Ser. No. 08/670,700, filed Jun. 26, 1996;

U.S. patent application Ser. No. 08/670,681, filed Jun. 26, 1996;

U.S. patent application Ser. No. 08/670,684, filed Jun. 26, 1996;

U.S. patent application Ser. No. 08/669,782, filed Jun. 26, 1996;

U.S. patent application Ser. No. 08/993,075 entitled "Method and Apparatus for Deferred Throwing of Exceptions in C++", filed by Christian J. Callsen and Ken M. Cavanaugh, and filed on an even date herewith;

U.S. patent application Ser. No. 08/993,800 entitled "Method and Apparatus for Fast, Local CORBA Object References", filed by Christian J. Callsen and Ken M. Cavanaugh, and filed on an even date herewith;

U.S. patent application Ser. No. 08/993,205 entitled "Method and Apparatus for Constructing Stable Iterators in a Shared Data Collection", filed by Christian J. Callsen and Ken M. Cavanaugh, and filed on an even date herewith;

U.S. patent application Ser. No. 08/993,204 entitled, "Method and Apparatus for Efficient Representation of Variable Length Identifiers in a Distributed Object System", filed by Ken M. Cavanaugh, and filed on an even date herewith;

U.S. patent application Ser. No. 08/993,287 entitled, "Filter Framework for Executing Code During Method Invocation", filed by Anita Jindal, Ken M. Cavanaugh, Sanjeev Krishnan and Rohit Garg, and filed on an even date herewith; and U.S. patent application Ser. No. 08/993,263 entitled, "Marshaling And Unmarshaling Framework For Supporting Filters In A Distributed Object System", filed by Anita Jindal, Ken M. Cavanaugh and Sanjeev Krishnan, and filed on an even date herewith.

FIELD OF THE INVENTION

This invention relates to distributed object systems using Common Object Request Broker Architecture (CORBA) and, more particularly, to a method and apparatus for implementing group object identification in object adapters.

BACKGROUND OF THE INVENTION

Software programs are continually becoming more complicated. Early programs consisted of straightforward procedural code that presented a simple, command line interface and text display to the user. These simple programs have gradually been replaced with complex programs that have graphical user interfaces and multiple features.

As programs have grown in complexity, the amount of effort which is required to write and debug the programs has also increased drastically. Consequently, major efforts have been made to reduce the amount of programming necessary to produce a modern, full-featured product. One of the most successful of these efforts has been the development of object-oriented programming in which programs are designed as collections of discrete elements called "objects". The objects can be modified and re-used in many cases, thereby reducing the development effort.

As will be understood by those skilled in the art, objects in the context of object-oriented programming are software entities comprising data and methods or operations on that data. The methods of an object collectively form an interface for manipulating the data in the object. The objects exist only at program runtime and are created, or instantiated, from object "classes" which are actually written by the programmer. The class code written by a programmer can be "reused" by another programmer by instantiating objects from that code.

In order to further reduce the programming burden, distributed object systems have been developed in which methods in objects resident on a server can be executed or invoked remotely over a network from a client application. In this manner, the objects can be developed and maintained by a party different from the party that developed the client application. In such a system information is routed or streamed between the client and the server. This information includes requests from the client to invoke an object on the server and results and data from the method invocation returning from the server to the client. In addition, object-oriented programs often communicate by streaming objects from one program to another.

In such streaming operations, a stream writer organizes, or marshals, the information to form a serial data stream. The serial data stream is then sent to the server where a stream reader unmarshals, the serial data stream to reconstruct a copy of the original information. The stream reader must operate such that the unmarshaling exactly "undoes" the effect of the marshaling so that the original information can be reconstructed. Ordinarily, such an operation does not present a problem, but when the stream reader is not written by the same author as the stream writer there can be incompatibilities.

In order to standardize the marshaling and unmarshaling and data transfer process, an industry consortium called the Object Management Group (OMG) was formed whose mission is to define a set of interfaces for inter-operable software. Its first specification, the Common Object Request Broker Architecture (CORBA) specification, is an industry consensus standard that hides all differences between programming languages, operating systems, and object location. The CORBA standard defines an object request broker (ORB) that handles the marshaling, transport and unmarshaling of information between applications. The ORB functions as a communication infrastructure, transparently relaying object requests across distributed heterogeneous computing environments. Inter-operability is accomplished through well-defined object interface specifications which allow client applications to connect to the ORB. CORBA provides an implementation independent notation for defining interfaces called the OMG Interface Definition Language (IDL).

The OMG CORBA specification defines an implementation independent object model which is actually built with a programming language, such as C++ or Java. In this model CORBA objects (also called "servants"), which are implemented by servers, have references that can be exported to clients. Clients and servers are roles, not mutually exclusive tasks for a single program, so that any one program can be both a client and a server. Objects and object references are typically different programming language objects, although they do not have to be. An object may also be controlled by an object manager.

In a server, the implementation of an actual object which can be used to satisfy an invocation on a CORBA object is generally both platform and language dependent and various models are possible for implementing objects in servers. The original CORBA standard defined a Basic Object Adapter (or BOA) which is a framework that adapts the server implementation to the implementation independent ORB. A newer OMG portability standard defines a Portable Object adapter (or POA), which replaces the BOA and is intended to be platform independent. Many ORBs also support other proprietary frameworks for implementing CORBA objects. All of these frameworks are commonly referred to as Object Adapters (or OAs).

Invocations on servants are conventionally performed by invoking a method on an object reference. As part of this invocation, the manager for the particular object (if there is such a manager) is typically given control of the process at some point before, and typically after, the actual invocation on the servant. There are many reasons for this transfer of control. For example, the object manager may have to create the servant, or the object manager may serialize all accesses to the servant. Alternatively, the servant's persistent data may need to be updated among other reasons.

When a multi-threaded ORB relinquishes control to the object manager, it is important, and, in most cases mandatory, that the ORB release any resource locks it is holding while performing a particular invocation. The ORB may be holding such locks to ensure that accesses to data shared between multiple threads are controlled in order to avoid non-deterministic behavior. Examples of such shared data are tables, access to transports, repositories, etc.

It is important that the ORB release the locks when the object manager has control for a number of reasons. For example, the object manager may need to use functionality provided by the ORB, and, if the ORB does not release locks it is holding, a deadlock would occur where the object manager cannot use ORB functionality, since the ORB itself is already locked. Another reason is that while the object manager is active, another thread may wish to use the services provided by the ORB, and it can only do so if the locks that the ORB is holding have been released.

It is therefore important that, when the ORB relinquishes control during so-called "upcalls"—either to object managers, to servants, or to other entities, it releases the locks it is holding while the upcall is taking place. However, it is also important that, as soon as the upcalls terminate—whether by normal termination, or due to an exception, that the locks that were temporarily released are re-acquired. If the locks are not re-acquired, then the locking invariants for the ORB implementation are broken, potentially causing deadlocks which will stop the process from executing.

Therefore, it would be desirable to have a simple mechanism for enforcing the locking invariants during upcalls.

SUMMARY OF THE INVENTION

In accordance with the principles of the invention, a special inverse lock class is defined whose constructor stores a reference to, and then releases, a previously-acquired lock whose reference is passed into it. The destructor of the class re-acquires the referenced lock. During operation, the class is instantiated, passing in the desired lock before an upcall is made. Instantiation executes the constructor and causes the lock to be released. When the upcall terminates, either normally or by an exception, the inverse lock object destructor is executed causing the lock to be re-acquired. Since the inverse lock object destructor will always be called when the object is destroyed, the locking invariant will always be satisfied.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

Figure 1:
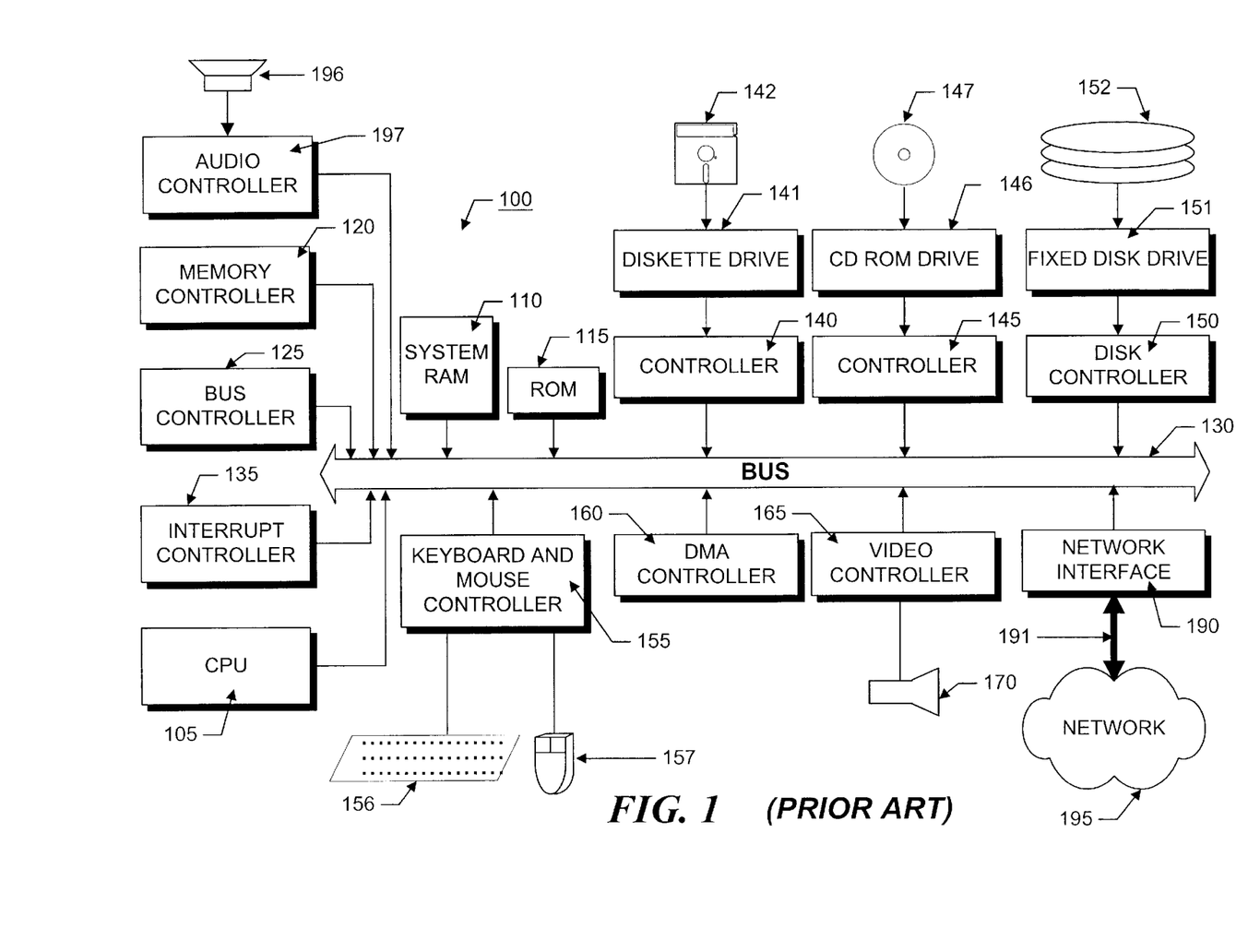
FIG. 1 is a schematic block diagram of an illustrative prior art hardware platform which forms part of a computer system on which the invention can be run.

FIG. 1 illustrates the system architecture for an exemplary client computer 100, such as an IBM THINKPAD 701® computer or Digital Equipment Corporation HiNote™ computer, on which the disclosed network access system (system) can be implemented. The exemplary computer system of FIG. 1 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 1.

The client computer 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with client computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the client computer 100 may be provided by a number of devices. For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to client computer 100 through bus 130 and an appropriate controller. DMA controller 160 is provided for performing direct memory access to system RAM 110. A visual display is generated by a video controller 165, which controls video display 170.

Client computer 100 also includes a network adapter 190 that allows the client computer 100 to be interconnected to a network 195 via a bus 191. The network 195, which may be a local area network (LAN), a wide area network (WAN), or the Internet, may utilize general purpose communication lines that interconnect multiple network devices.

Client computer system 100 generally is controlled and coordinated by operating system software, such as the WINDOWS 95® operating system (available from Microsoft Corp., Redmond, Wash.). Among other computer system control functions, the operating system controls allocation of system resources and performs tasks such as process scheduling, memory management, networking and I/O services.

Figure 2:
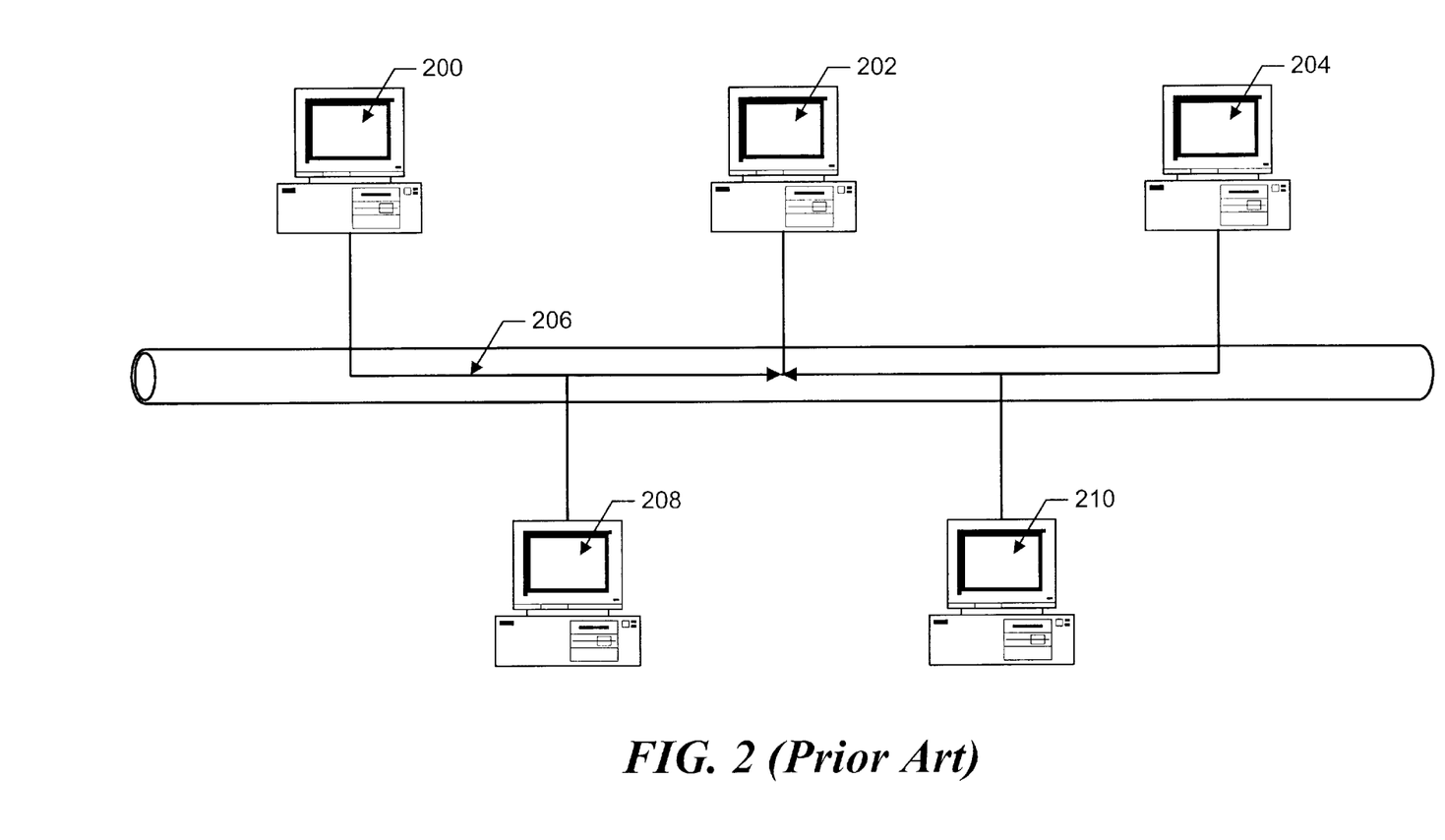
FIG. 2 is a schematic diagram of a prior art computer network system on which a CORBA system can be built.

FIG. 2 illustrates, in a very simple fashion, the connection of a number of computing systems, such as that shown in FIG. 1, to form a distributed computing facility. Each of the individual stations 200, 202, 204, 208 and 210 are interconnected by a network mechanism. Although the distributing computing facility could exist on a single computing system, it is more likely to operate over a network transport medium. Such a transport medium may be LAN as shown in FIG. 2, but may also be other network arrangements, including the Internet. All that is necessary is that the terminals 200, 202, 204, 208 and 210 be able to communicate with each other using predefined protocols to exchange information. As previously mentioned, the CORBA architecture overlays such a network and relieves the individual applications from dealing with the details of transporting information over the network. More particularly, the CORBA architecture hides all of the details and the actual network protocols from the application programs. It assures that the application programs operate with each other regardless of the platforms on which the software is designed to run and regardless of the network protocols used to interconnect separate computing systems.

Figure 3:
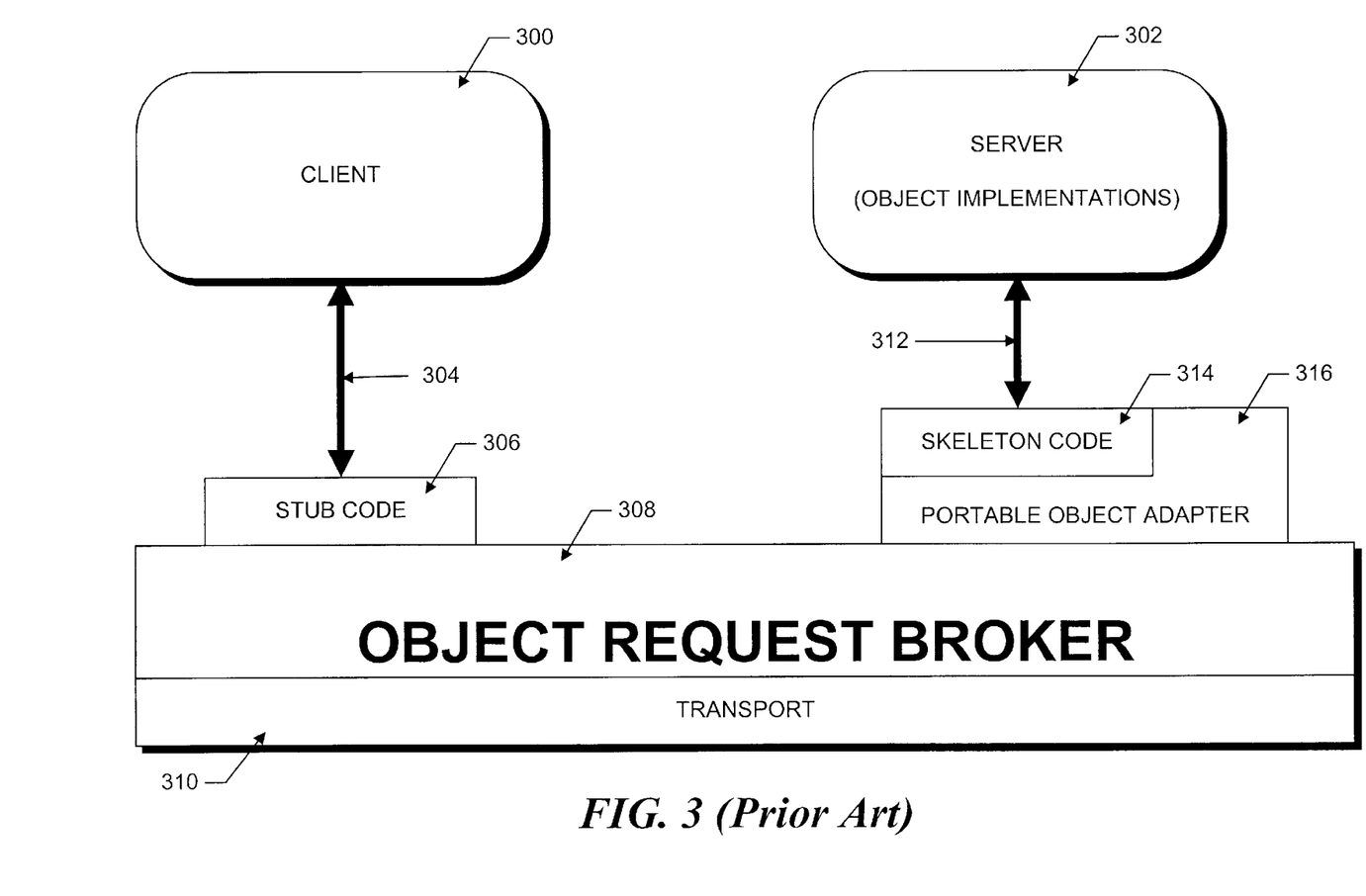
FIG. 3 is a block schematic diagram illustrating a prior art CORBA environment and showing the relationship of the client, ORB, object adapter and server.

FIG. 3 illustrates, in a very schematic form, the basic CORBA architecture which defines a peer-to-peer distributed computing facility where all applications are objects (in the sense of object orientation). Objects can alternate between client roles 300 and server roles 302. An object operates in a client role 300 when it is the originator of an object invocation. An object operates in a server role 302, called an object implementation, when it is the recipient of an object invocation.

The client 300 communicates with the server 302 by means of an object request broker or ORB 308. The ORB 308 operates with a transport 310 that conveys information between the client 300 and server 302 and, as previously mentioned, the ORB 308 handles the marshaling, transport and unmarshaling of information between client 300 and server 302. The client 300 communicates with the ORB 308, as indicated schematically by arrow 304, by means of an implementation independent syntax which describes object encapsulations. This syntax is called an interface definition language (IDL) and is defined in the CORBA specification generated by OMG. The OMG interface definition language can be used to define interfaces that have attributes and operation signatures. The language also supports inheritance between interface descriptions in order to facilitate reuse by developers. Objects or servants in the server 302 export object references with interfaces specified by the OMG IDL for use by clients. The object reference contains an identification of the object implementation so that the server 302 can pass a request to the correct object.

The entire CORBA architecture is actually implemented in a conventional programming language, such as C, C++, or Smalltalk. Implementations in a variety of languages are available from a number of vendors who typically provide a compiler bundled with their ORB products. The compilers generate header files which define the OMG IDL interfaces and can be incorporated into application programs. The compilers also generate stub code 306 and skeleton code 314 for each interface.

The client application program 300 can link directly to the OMG IDL stub code 306. As far as the client application program is concerned, an invocation of the stub code 306 appears to be a local function call. Once invoked, the stub code 306 provides an interface to the ORB 308 that performs marshaling to encode and decode the operation's parameters into communication formats suitable for transmission on the transport 310 to the server 302.

At the server side, the OMG IDL skeleton code 314 is the corresponding implementation of the OMG IDL interface. When the ORB 308 receives a request, the skeleton code 314 unmarshals the request parameters and generates a call, indicated schematically by arrow 312, to an object implementation in the server 302. When the server completes processing of the request, the skeleton code 314 and stub code 306 return the results to the client program 300. If an error has occurred, exception information generated by the server or by the ORB is returned.

An object adapter 316 comprises the interface between the ORB 308, the skeleton code 314 and the server 302. Object adapters, such as adapter 316, support functions, such as registration of object implementations and activation of servers.

Figure 4A:
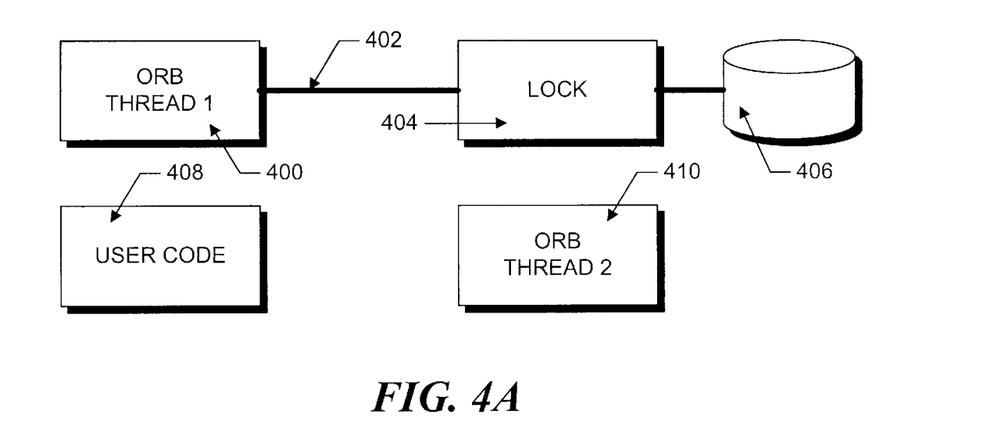
FIG. 4A illustrates a multi-threaded ORB holding a lock to a resource.
Figure 4B:
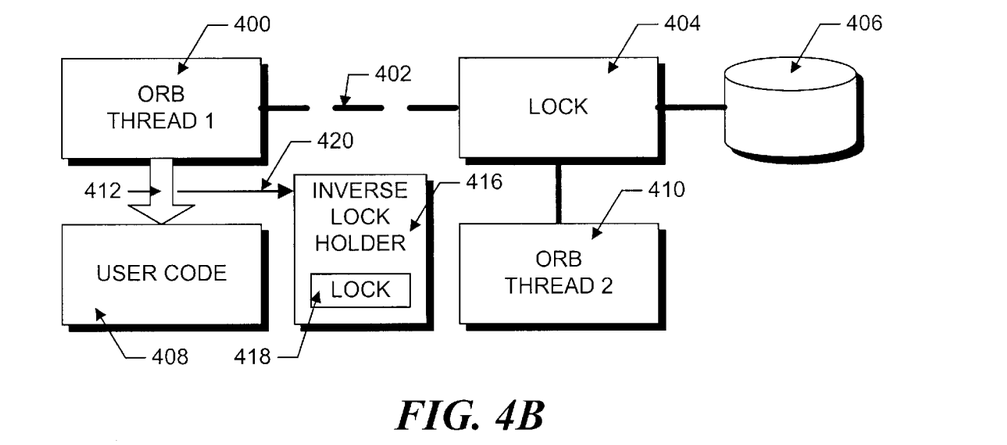
FIG. 4B illustrates the multi-threaded ORB releasing the resource lock and transferring control to user code during an upcall.
Figure 4C:
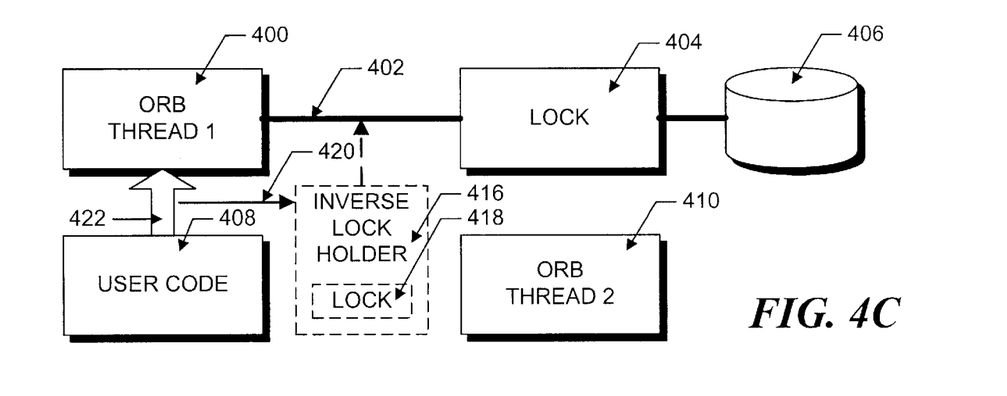
FIG. 4C illustrates the user code returning control to the multi-threaded ORB at the termination of the upcall and the ORB re-acquiring the resource lock.

FIGS. 4A, 4B and 4C illustrate a multi-threaded ORB performing an upcall to client-written code. During this operation a lock on a resource is released and then re-acquired. FIG. 4 shows two ORB threads 400 and 410. ORB thread 400 is holding the lock 404 which controls a resource 406. The acquisition of lock 404 by ORB thread 400 is indicated in line 402 and would be accomplished in a conventional manner. In the illustrative sequence, ORB thread 400 will perform an upcall to user code 408.

As shown in FIG. 4B, ORB thread 400 releases the lock 404 and performs the upcall to user code 408, for example, by means of a method call as schematically illustrated by arrow 412. In accordance with the invention the method call 412 instantiates an "inverse lock" object 416 as schematically illustrated by arrow 420. The inverse lock object 416 stores a reference to lock 404 in an internal variable 418. The inverse lock object releases the lock as indicated by dotted arrow 402. At this time, another ORB thread, for example, ORB thread 410, is free to acquire lock 404 as indicated by line 414.

Finally, as shown in FIG. 4C, user code 408 returns control to ORB thread 400 as indicated by arrow 422. ORB thread 400 then must re-acquire lock 404 in order to maintain the locking invariants. Either explicitly, or implicitly, the return 422 causes the inverse lock object 416 to be destroyed as indicated by the dotted object 416. The destruction of object 416 re-acquires the lock 404 as indicated by arrow 402. Multi-thread safe operations can then be performed by threads 400 and 410.

Figure 5:
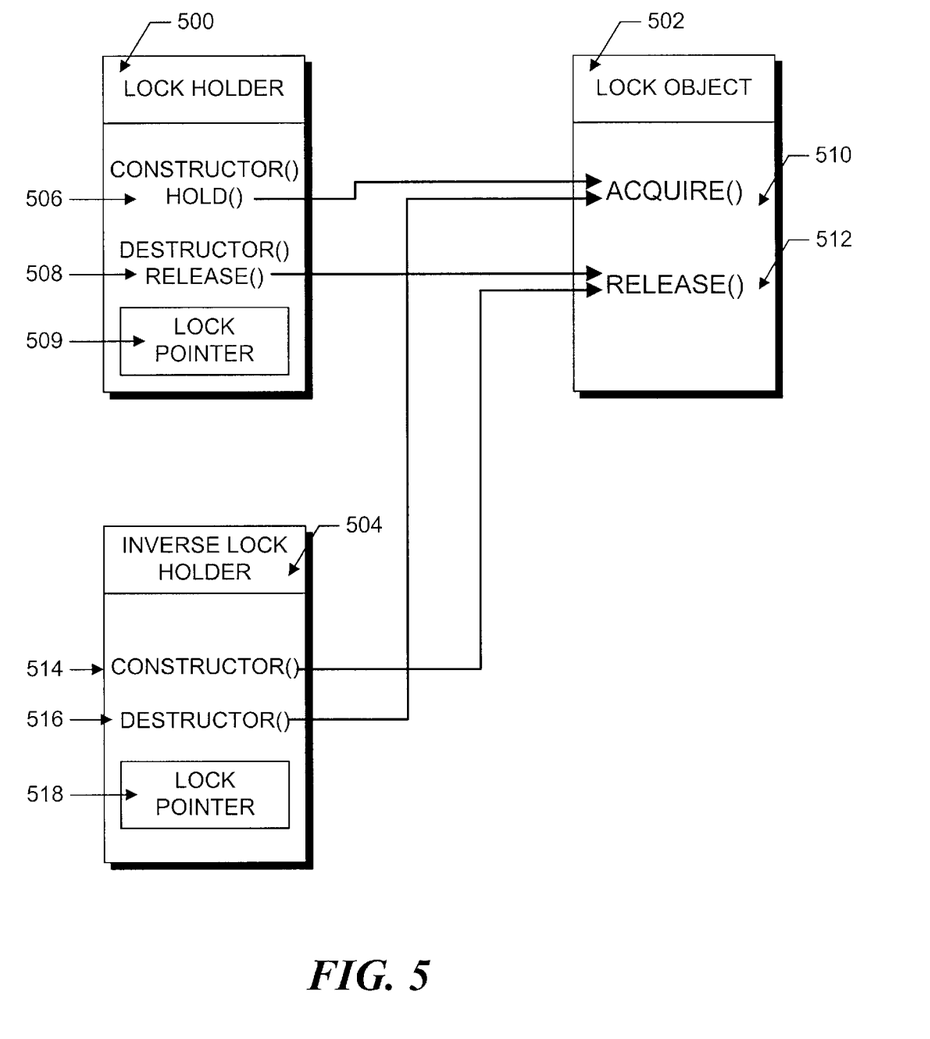
FIG. 5 is a simplified class diagram illustrating the relationship of a lockholder object and an InverseLockHolder object to a lock object.

FIG. 5 illustrates the relation of a conventional lock holder object and the inventive "inverse lock holder" object to the acquire( ) and release( ) methods in a lock object. The lock holder object 500 includes a constructor 506 which executes a hold( ) method. The hold( ) method, in turn, invokes the acquire( ) method 510 of the lock object 502, passing in a reference to the lock. Thus, when the lock holder object 500 is instantiated, the lock encapsulated in the lock object 502 is acquired and the passed in lock reference is stored in an internal variable 509. Conversely, when the lock holder object 500 is destroyed, its destructor, 508, executes a release( ) method that invokes the release( ) method 512 of the lock object 502, thereby releasing the lock.

In accordance with the principles of the invention, the inverse lock holder object 504 operates in an opposite manner. The constructor 514 of the inverse lock holder object 504 invokes the release( ) method 510 of the lock object 502. Thus, when the inverse lock holder object 504 is instantiated, a lock whose reference is passed into the constructor is released. As will be hereinafter explained, when the inverse lock holder object 504 is instantiated, the passed in lock reference is stored in an internal variable 518. When the inverse lock holder object 504 is destroyed, its destructor 516 locates the referenced lock object 502 and invokes the acquires ( ) method 510 to re-acquire the lock.

It is important that the programming language which is used to implement the inverse lock holder object force the execution of the destructor whether the inverse lock holder object is destroyed during normal operation or whether the inverse lock holder object is destroyed during an abnormal termination, such as an exception. For example, the C++ programming language allows the definition of classes, which can have user-defined constructors and destructors. The destructor is invoked whenever an instance of a class is destroyed, regardless of normal or abnormal termination. The C++ programming language specification guarantees this—no matter how execution is proceeding. In the following description the C++ programming language is used to illustrate the invention, although it can be expressed in other programming languages as well subject to the requirement that the object destructor must always be run when the object is destroyed.

Assuming that a class implementing a multi-threaded lock (called Lock) has been defined, with two methods called "release" and "acquire" for releasing and acquiring the lock, respectively, an InverseLockHolder class could be implemented in the C++ language as follows:

```
class InverseLockHolder {
        Lock &the_lock;
    public:
        InverseLockHolder(Lock &lock):the_lock(lock) {
            the_lock.release();      //the inverse lock object constructor
                                     //releases the lock
        }
        ~InverseLockHolder() {       //the inverse_lock object destructor
            the_lock.acquire();      //re-acquires the lock
        }
};
```

In alternative implementation, "acquire( )" and "release( )" methods can be included in the InverseLockHolder class for additional control. Such an illustrative implementation could be as follows:

```
class InverseLockHolder {
        int held;
        Lock &the_lock;
    public:
        InverseLockHolder(Lock &lock) : the_lock(lock) {
            release();;              // the inverse lock object
                                     //constructor releases the lock
        }
        void release() { held = 0; the_lock.release(); }
        void acquire() { the_lock.acquire(); held = 1; }
        ~InverseLockHolder() {
            if (!held) acquire();    // the inverse lock object
                                     //destructor acquires the lock if
                                     //not already held
        }
};
```

Although instances of the InverseLockHolder can be allocated dynamically, they are typically allocated "on the stack" by defining them. The C++ language guarantees that objects allocated "on the stack" will be destroyed regardless of normal or abnormal termination.

Figure 6:
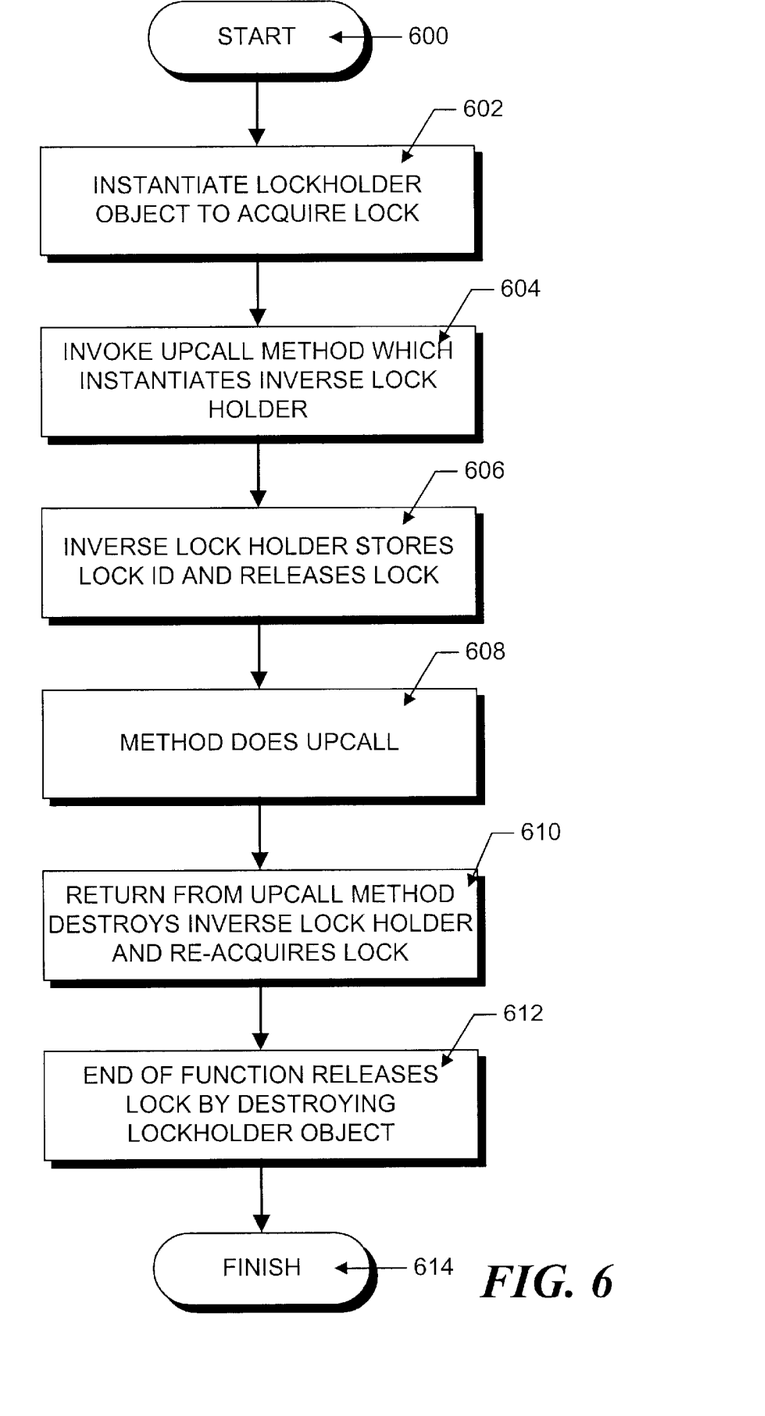
FIG. 6 is a flowchart showing an illustrative upcall procedure using the InverseLockHolder object to release and re-acquire the lock during an upcall procedure.

The operation of the InverseLockHolder object during an upcall made by an ORB is illustrated in FIG. 6. The operation starts at step 600 and proceeds to step 602 where a lock is acquired by conventional means, such as by instantiating a lock holder object 500. Next, in step 604, the ORB invokes a method which performs the upcall. This method instantiates an InverseLockHolder object and passes in a reference to the lock. As previously mentioned, operation of the constructor in the InverseLockHolder object 504, causes the operation set forth in step 606 in which the InverseLockHolder stores the lock ID and then releases the lock. Next, in step 608, the upcall method performs the upcall operation.

In step 610, the return from the upcall method destroys the InverseLockHolder. The InverseLockHolder may be destroyed explicitly by a call to its destructor in the upcall method, or in those systems which employ memory management techniques such as garbage collection, the object will be destroyed by the operating system. In either case, the lnverseLockHolder destructor is invoked and re-acquires the lock. Finally, in step 612, the end of the operation destroys the lock holder object, which, in turn, releases the lock and the routine finishes in step 614.

An illustrative C++ coding of such an operation is shown in the following code fragment:

```
void do_operation_with_upcall() {
    Lock lock;
    LockHolder hold(lock);
            // INVARIANT: the lock is now held
    . . . multi-thread safe operations can happen here . . .
    {
            // COMMENT: prepare for an upcall
            InverseLockHolder do_not_hold(lock)
            // INVARIANT: the lock is now NOT held
            //              other threads can have access to
            //              shared resources
            do_the_upcall();
    }
            // INVARIANT: the lock is now held again
            . . . multi-thread safe operations can happen here . . .
            return;     // when the function returns,
                        // the LockHolder object will release the lock
}
```

Therefore, with the help of the LockHolder and the InverseLockHolder, the locking invariants can be guaranteed. This reduces potential programming errors and prevents deadlocks of the programs using the objects.

A software implementation of the above-described embodiment may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the problem stated above was described in terms of multi-threaded ORB implementations, it applies to other multi-threaded programs as well. For example, such multi-threaded programs may need to relinquish control to at least partially user-written code. When control is released the programs will typically need to release locks, at least while the upcall is taking place. Further, as stated above the inventive object can be implemented in a programming language other than C++. Other aspects such as the specific configuration of logic and/or instructions utilized to achieve a particular function, as well as other modifications to the inventive concept are intended to be covered by the appended claims.

What is claimed is:

1. Apparatus for enforcing locking invariants in a multi-threaded system with a memory in which a first program holding a resource lock performs an upcall operation to a second program, the apparatus comprising:

inverse lock holder class code in the memory having constructor method code which constructs an inverse lock holder object and releases the resource lock, and destructor method code which acquires the resource lock and destroys the inverse lock holder object;

an upcall method in the first program which instantiates the inverse lock holder class code and then performs the upcall operation; and a mechanism in the multi-threaded system which destroys an instantiated inverse lock holder object when the upcall method finishes.

2. Apparatus according to claim 1 wherein the resource lock has a reference and wherein the upcall method passes the reference to the constructor method code during the instantiation.

3. Apparatus according to claim 2 wherein the inverse lock holder object comprises an internal variable for holding the reference to the resource lock, which reference is stored by the constructor method code.

4. Apparatus according to claim 3 wherein the destructor method code, prior to destruction of the inverse lock holder object, re-acquires a resource lock identified by the reference stored in the internal variable.

5. Apparatus according to claim 1 wherein the resource lock is contained within a lock object having an acquire method for acquiring the resource lock and a release method for releasing the resource lock.

6. Apparatus according to claim 5 wherein the lock object constructor method calls the acquire method of the lock object.

7. Apparatus according to claim 5 wherein the lock object destructor method calls the release method of the lock object.

8. Apparatus according to claim 1 wherein the mechanism comprises a method for explicitly calling the inverse lock holder object destructor method code.

9. Apparatus according to claim 1 wherein the multi-threaded system comprises an operating system and wherein the mechanism comprises a method in the operating system for destroying unused objects.

10. A method for enforcing locking invariants in a multi-threaded system with a memory in which a first program holding a resource lock performs an upcall operation to a second program, the method comprising the steps of:

(a) creating inverse lock holder class code in the memory having constructor method code which constructs an inverse lock holder object and releases the resource lock, and destructor method code which acquires the resource lock and destroys the inverse lock holder object;

(b) invoking an upcall method in the first program which instantiates the inverse lock holder class code and then performs the upcall operation; and (c) destroying an instantiated inverse lock holder object when the upcall method finishes.

11. A method according to claim 10 wherein the resource lock has a reference and wherein step (b) comprises the step of:

(b1) passing the reference to the constructor method code during the instantiation.

12. A method according to claim 11 wherein the inverse lock holder object comprises an internal variable and step (b) comprises the step of:

(b2) storing the reference to the resource lock in the internal variable.

13. A method according to claim 12 wherein in step (c) the destructor method code re-acquires a resource lock identified by the reference stored in the internal variable.

14. A method according to claim 10 further comprising the step of:

(d) instantiating a lock object containing the resource lock and having an acquire method for acquiring the resource lock and a release method for releasing the resource lock.

15. A method according to claim 14 wherein in step (b) the constructor method code calls the lock object acquire method.

16. A method according to claim 14 wherein in step (c) the destructor method code calls the lock object release method.

17. A method according to claim 10 wherein step (c) comprises the step of:

(c1) explicitly calling the inverse lock holder object destructor method code.

18. A method according to claim 10 wherein the multi-threaded system comprises an operating system and wherein step (c) comprises the step of:

(c2) invoking a method in the operating system for destroying unused objects.

19. A computer program product for enforcing locking invariants in a multi-threaded system with a memory in which a first program holding a resource lock performs an upcall operation to a second program, the computer program product comprising a computer usable medium having computer readable program code thereon including:

inverse lock holder class code having constructor method code which constructs an inverse lock holder object and releases the resource lock, and destructor method code which acquires the resource lock and destroys the inverse lock holder object;

upcall method code in the first program which instantiates the inverse lock holder class code and then performs the upcall operation; and program code which destroys an instantiated inverse lock holder object when the upcall method finishes.

20. A computer program product according to claim 19 wherein the resource lock has a reference and wherein the upcall method code comprises program code for passing the reference to the constructor method code during the instantiation.

21. A computer program product according to claim 20 wherein the inverse lock holder object comprises an internal variable and wherein the constructor method code comprises program code for storing the reference to the resource lock in the internal variable.

22. A computer program product according to claim 21 wherein the destructor method code includes program code for re-acquiring a resource lock identified by the reference stored in the internal variable.

23. A computer program product according to claim 19 further comprising constructor code for instantiating a lock object containing the resource lock, which lock object has an acquire method for acquiring the resource lock and a release method for releasing the resource lock.

24. A computer program product according to claim 23 wherein the inverse lock holder constructor method code includes program code for calling the lock object acquire method.

25. A computer program product according to claim 23 wherein the inverse lock holder destructor method code includes program code for calling the lock object release method.

26. A computer program product according to claim 19 wherein the program code for destroying the inverse lock holder object when the upcall method finishes comprises program code for explicitly calling the inverse lock holder object destructor method code.

27. A computer program product according to claim 19 wherein the program code for destroying the inverse lock holder object comprises a method in the operating system for destroying unused objects.

28. Apparatus for enforcing locking invariants in a CORBA distributed object system with a memory in which an object request broker instantiates a lock object to acquire a resource lock, the apparatus comprising:

inverse lock holder class code in the memory having constructor method code which constructs an inverse lock holder object, stores a reference to the resource lock in the memory and then causes the lock object to release the resource lock, and destructor method code which causes the lock object to re-acquire the resource lock and then destroys the inverse lock holder object;

an upcall method in the object request broker which instantiates the inverse lock holder class code to construct an inverse lock holder object and then performs an upcall operation to a server program; and a mechanism in the distributed object system which destroys all objects instantiated by the upcall method when the upcall method returns.

29. Apparatus according to claim 28 wherein the server program comprises a mechanism for acquiring the resource lock during the upcall operation.

30. Apparatus according to claim 28 wherein the object request broker is multi-threaded and a first thread of the multi-threaded object request broker instantiates the lock object to acquire the resource lock and then invokes the upcall method.

31. Apparatus according to claim 30 wherein a second thread of the multi-threaded object request broker acquires the resource lock during the upcall operation.

32. Apparatus according to claim 30 wherein the lock object is destroyed by the distributed object system when the first thread terminates.

33. Apparatus according to claim 30 wherein the lock object is destroyed by the first thread invoking the lock object destructor.

34. A method for enforcing locking invariants in a CORBA distributed object system with a memory in which an object request broker instantiates a lock object to acquire a resource lock, the method comprising the steps of:

(a) creating inverse lock holder class code in the memory having constructor method code which constructs an inverse lock holder object, stores a reference to the resource lock in the memory and then causes the lock object to release the resource lock, and destructor method code which causes the lock object to re-acquire the resource lock and then destroys the inverse lock holder object;

(b) invoking an upcall method in the object request broker which instantiates the inverse lock holder class code to construct an inverse lock holder object and then performs an upcall operation to a server program; and (c) destroying all objects instantiated by the upcall method when the upcall method returns.

35. A method according to claim 34 further comprising the step of:

(d) using the server program to acquire the resource lock during the upcall operation.

36. A method according to claim 34 wherein the object request broker is multi-threaded and step (b) comprises the steps of:

(b1) using a first thread of the multi-threaded object request broker to instantiate the lock object and acquire the resource lock; and (b2) using the first thread to invoke the upcall method.

37. A method according to claim 36 further comprising the step of:

(e) using a second thread of the multi-threaded object request broker to acquire the resource lock during the upcall operation.

38. A method according to claim 36 further comprising the step of:

(f) using the distributed object system to destroy the lock object when the first thread terminates.

39. A method according to claim 36 further comprising the step of:

(g) invoking the lock object destructor with the first thread.

* * * * *